Figure 1:
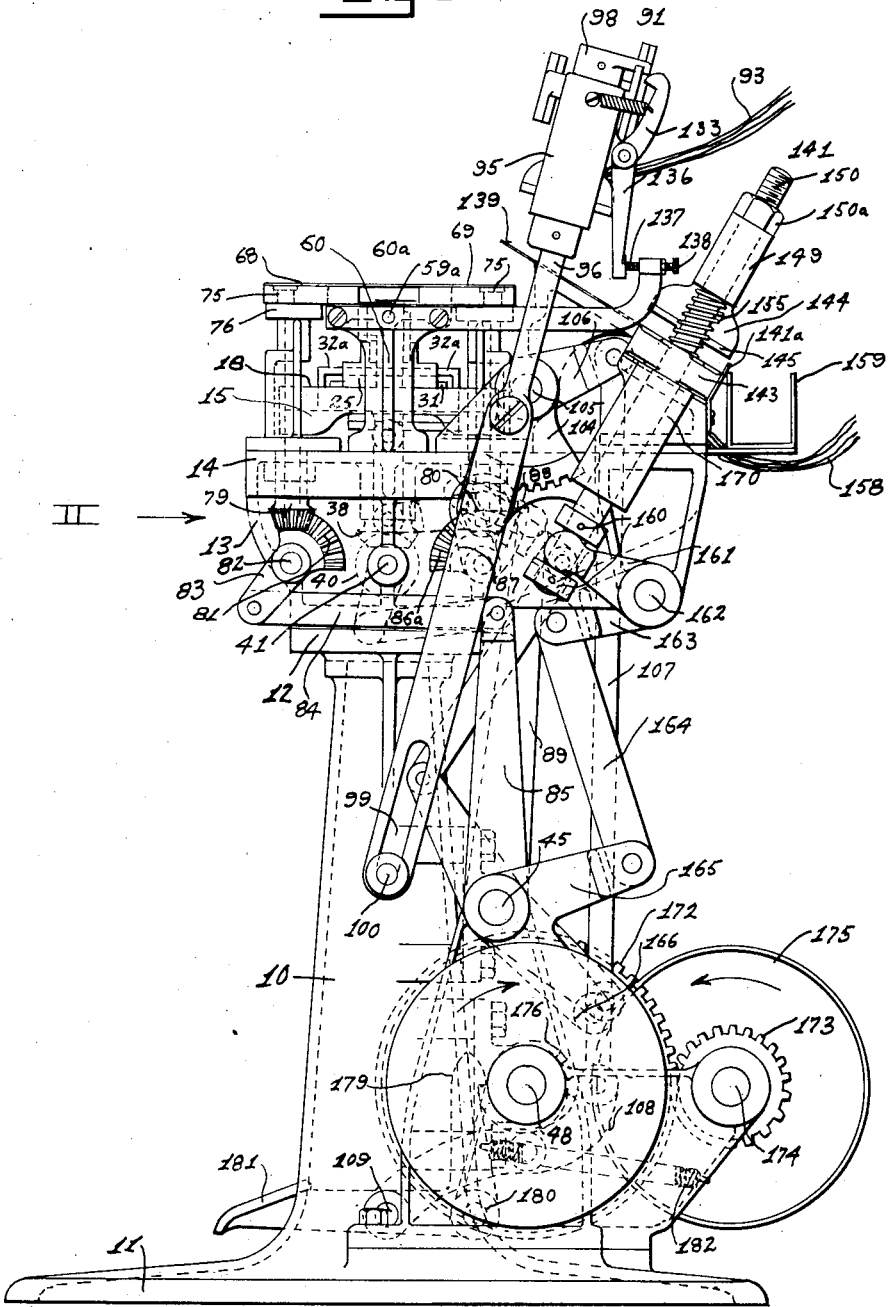

B. W. TUCKER.
MACHINE FOR FOLDING COLLARS, &c.
APPLICATION FILED MAR. 22, 1909.

1,086,421.

Patented Feb. 10, 1914.
10 SHEETS—SHEET 1.

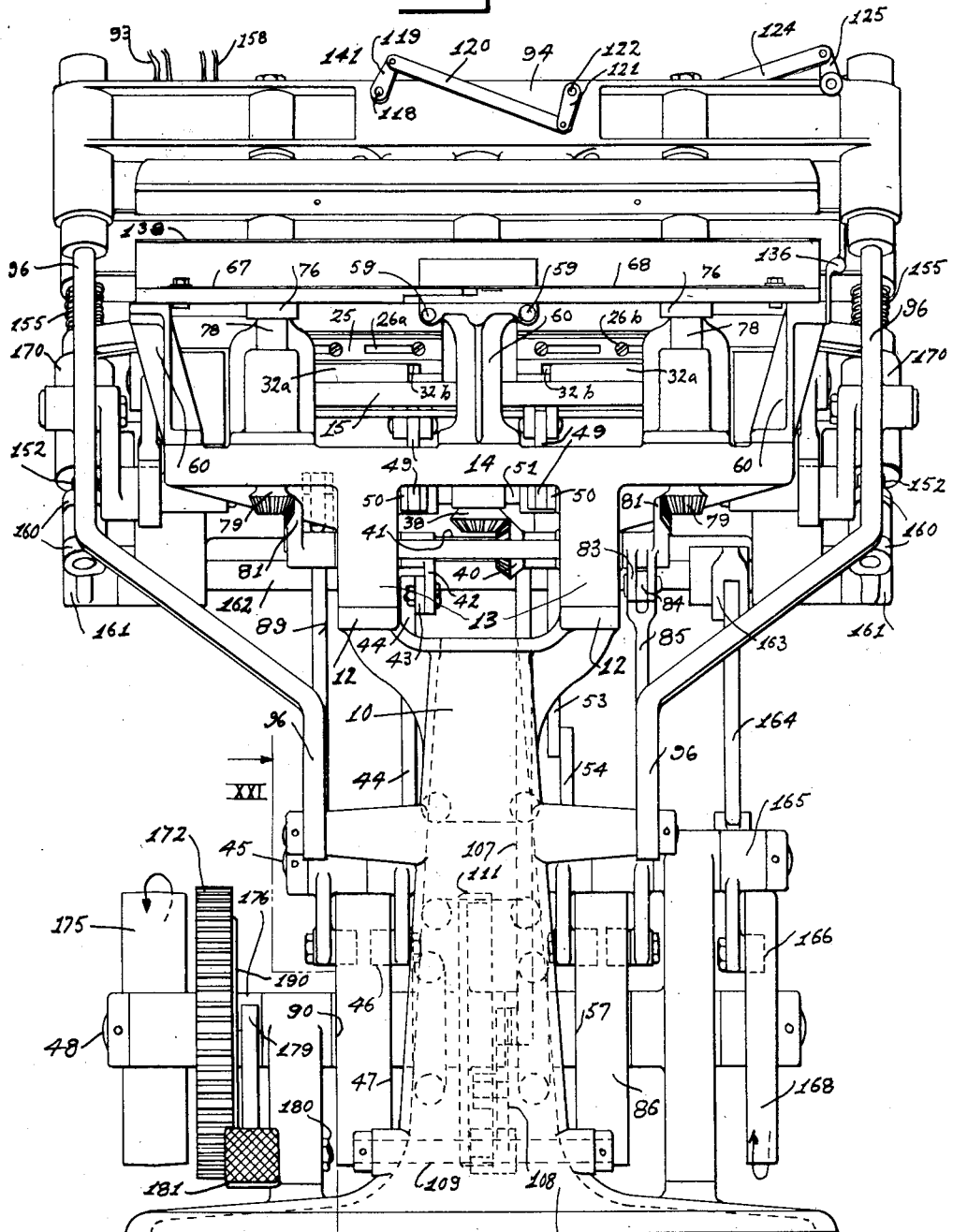

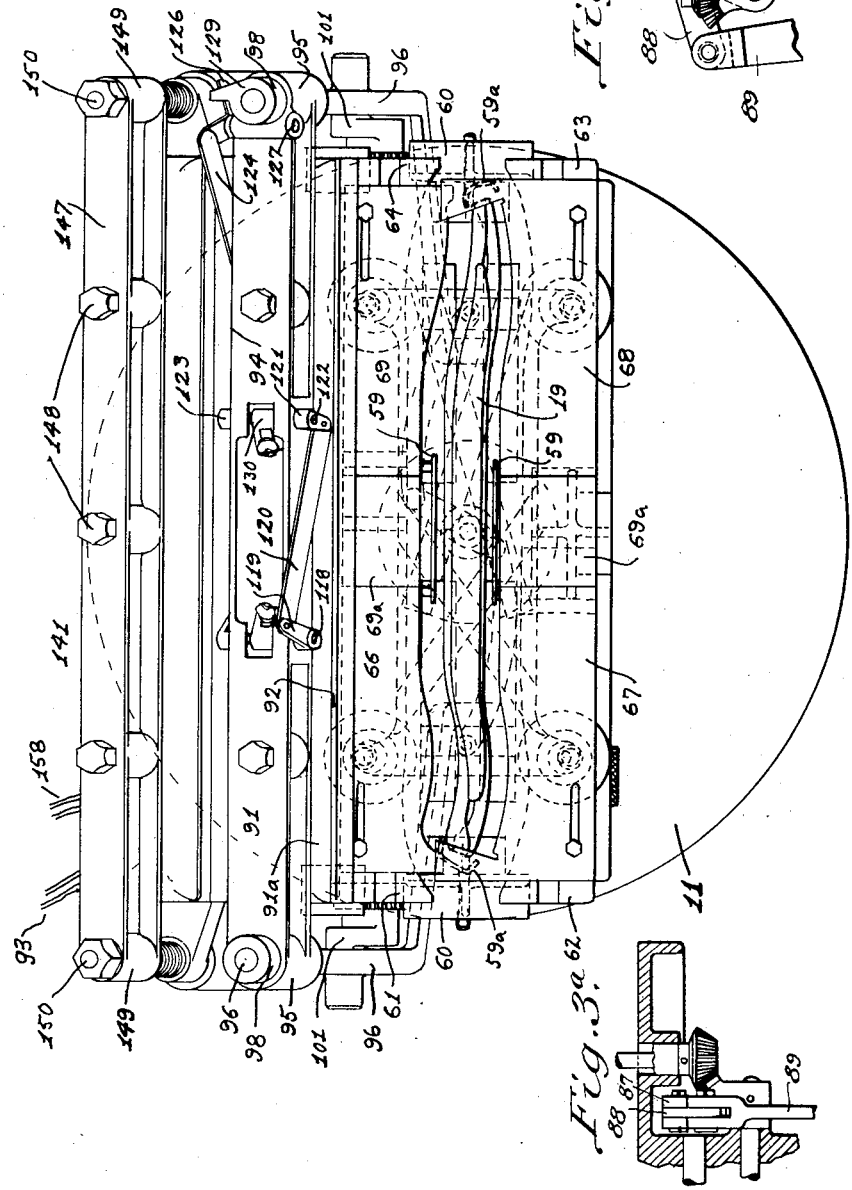

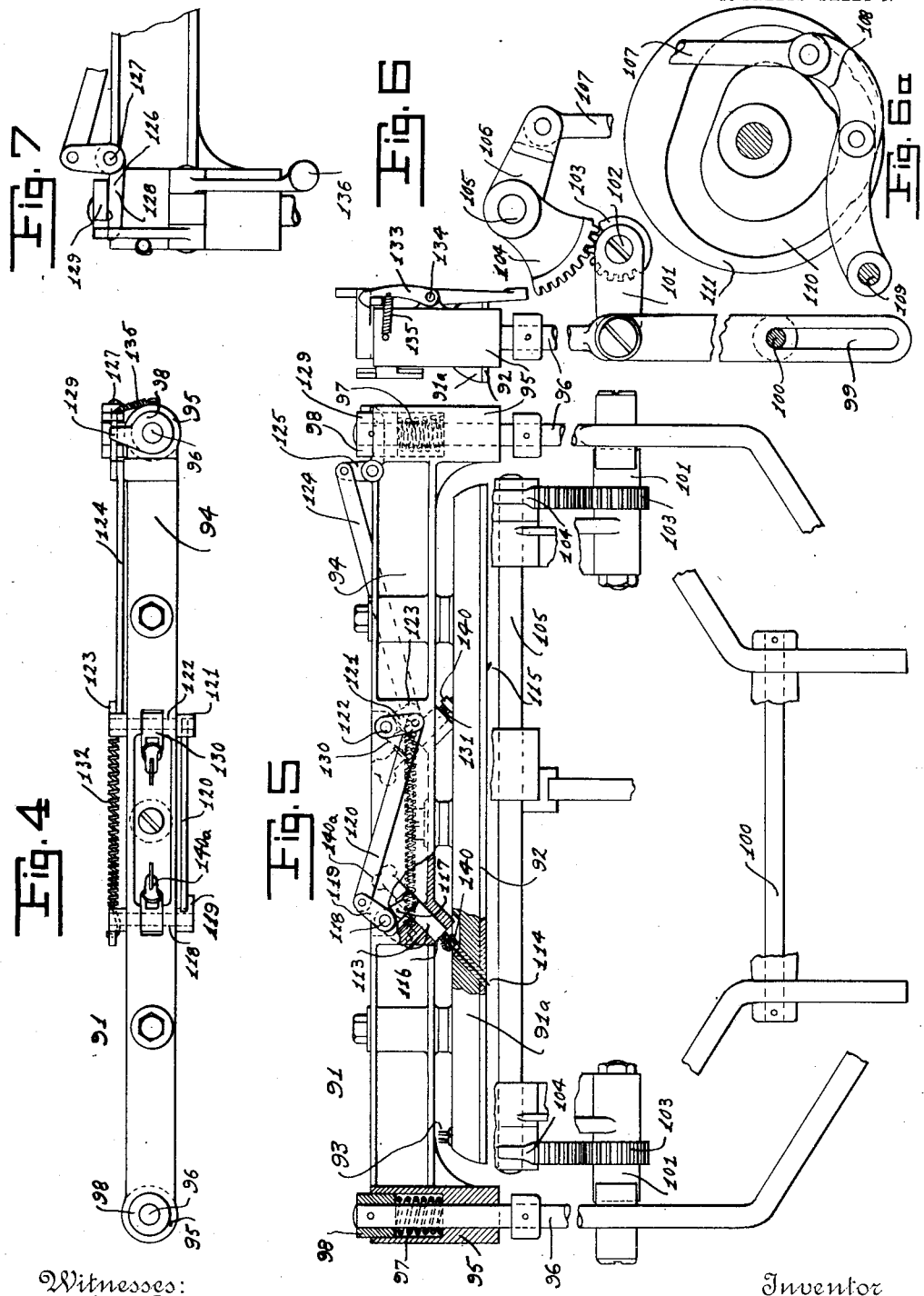

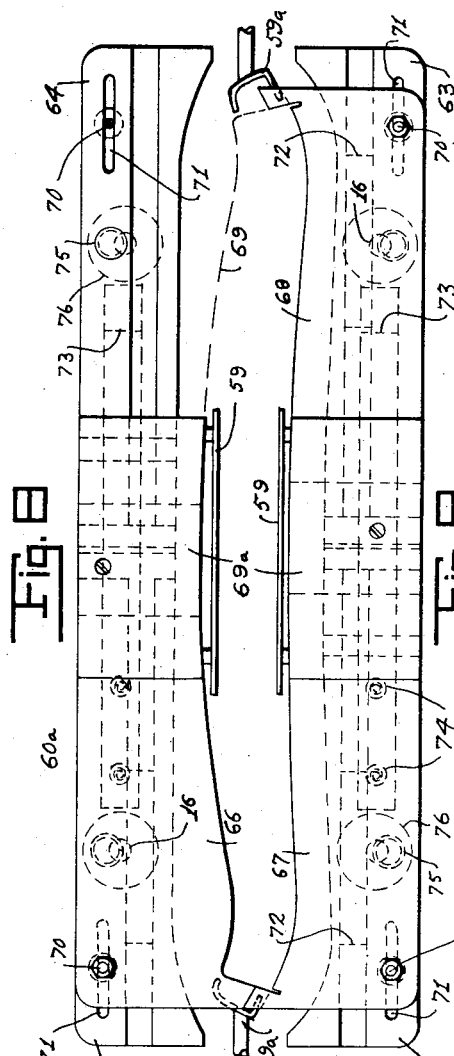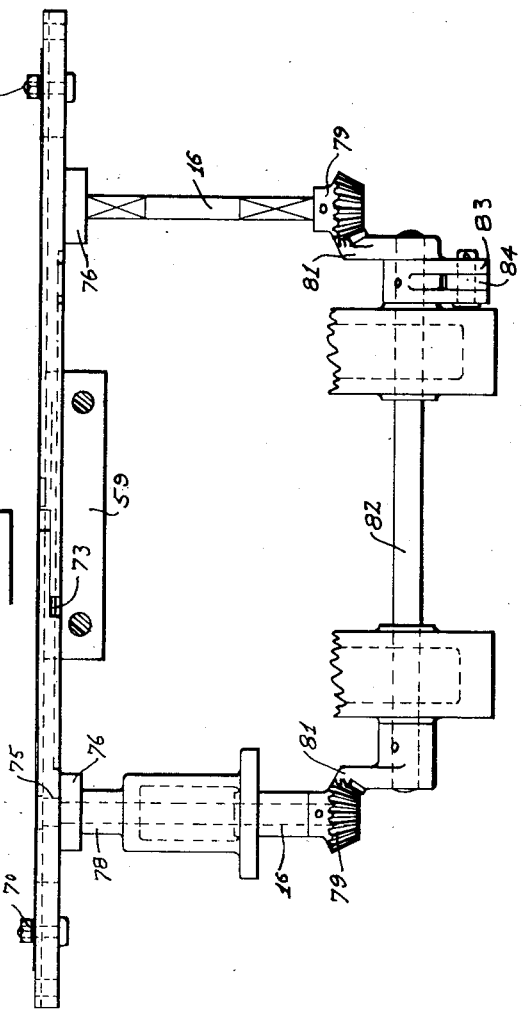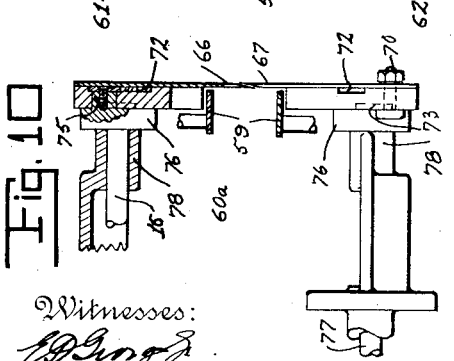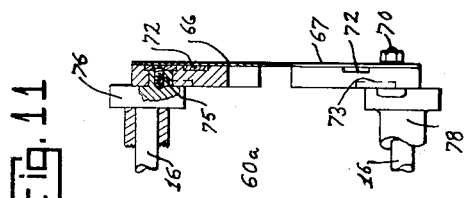

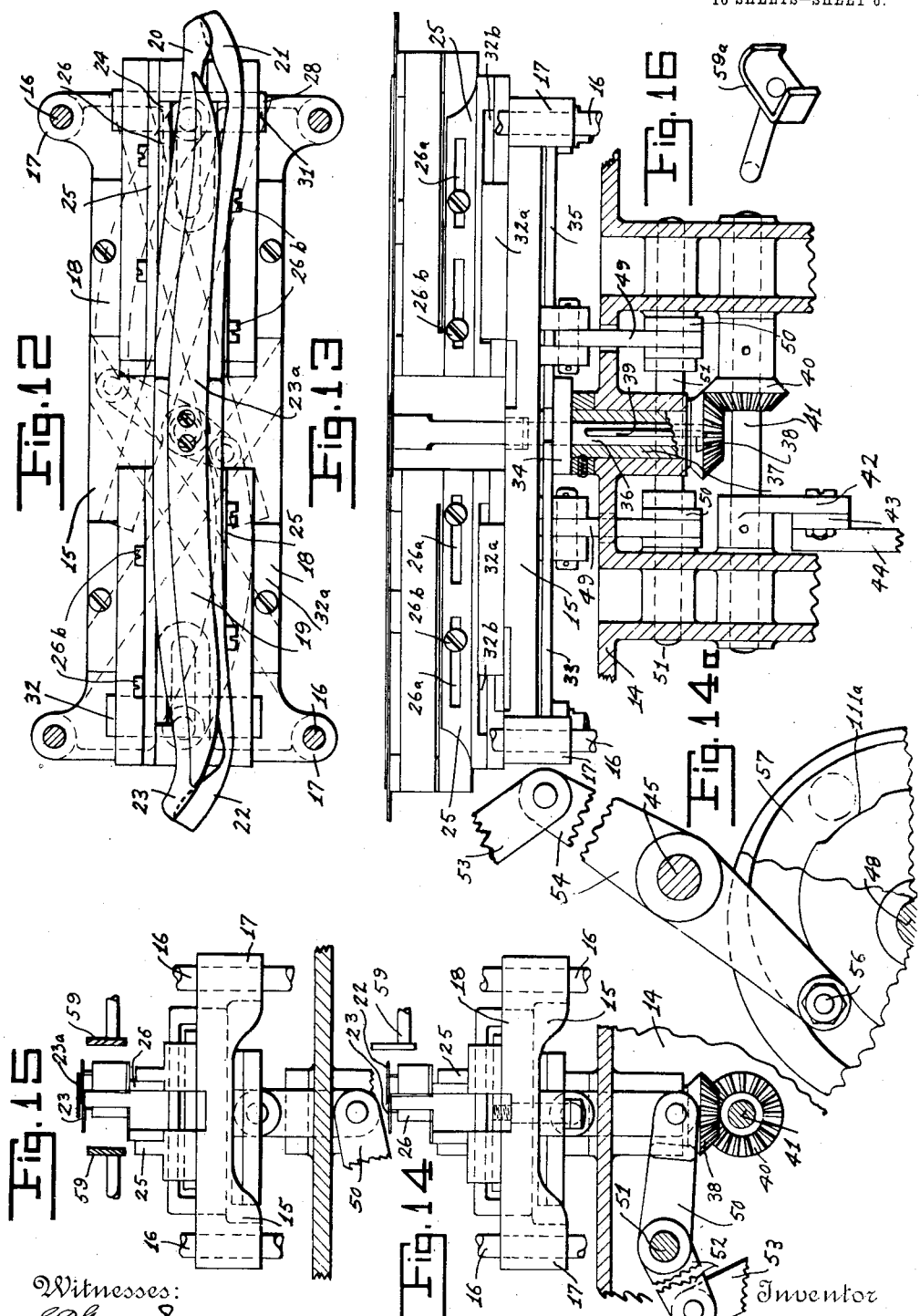

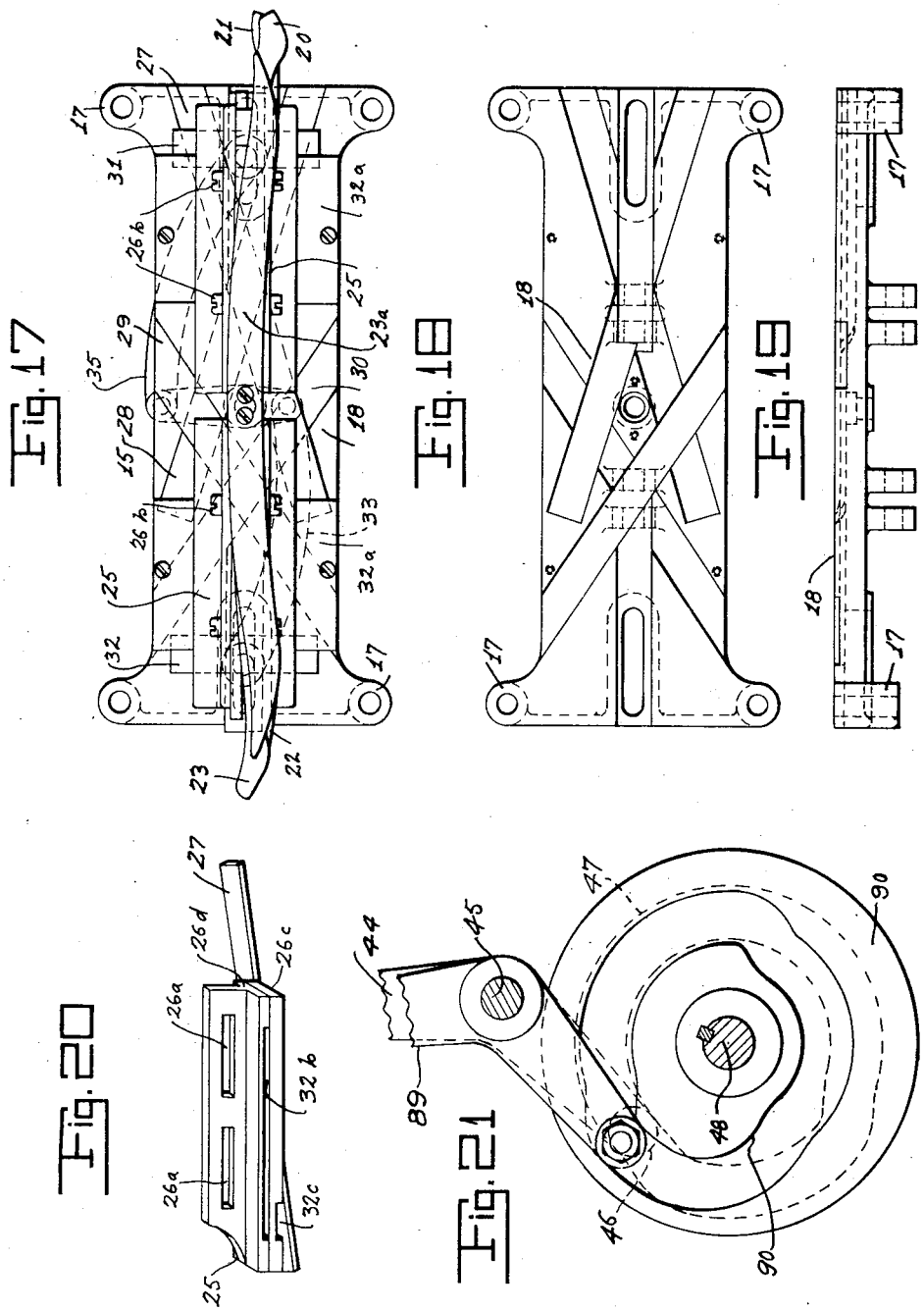

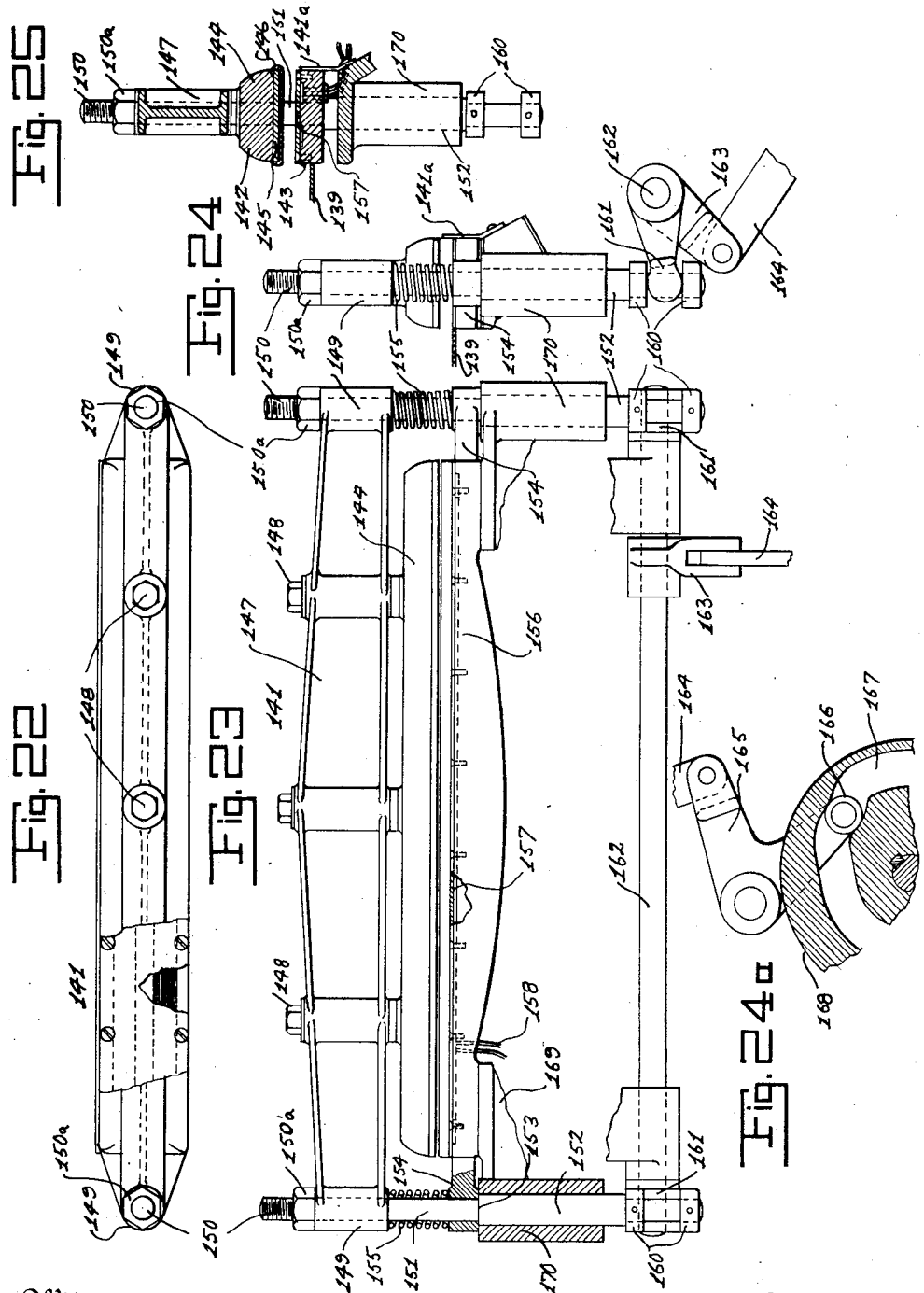

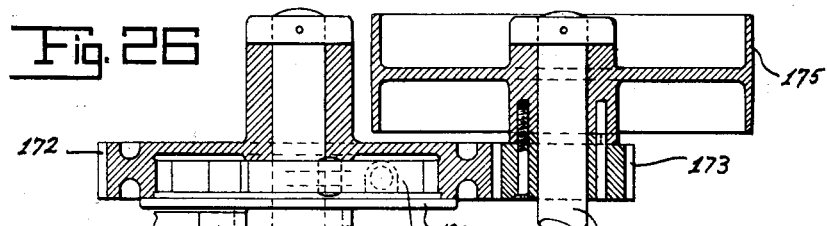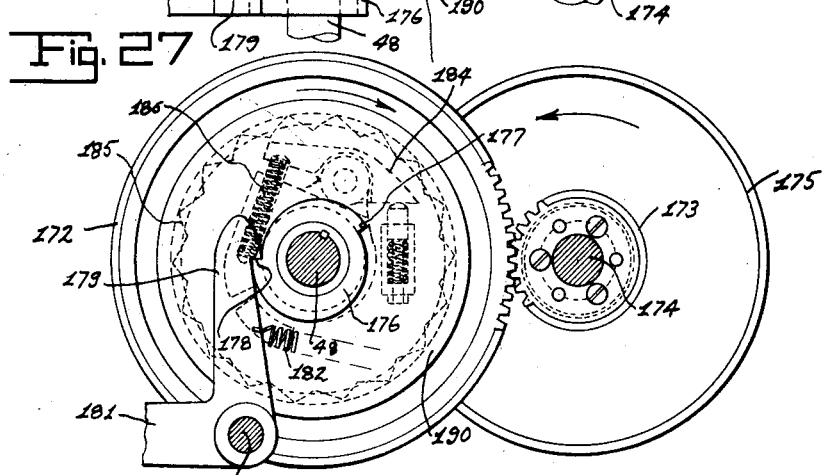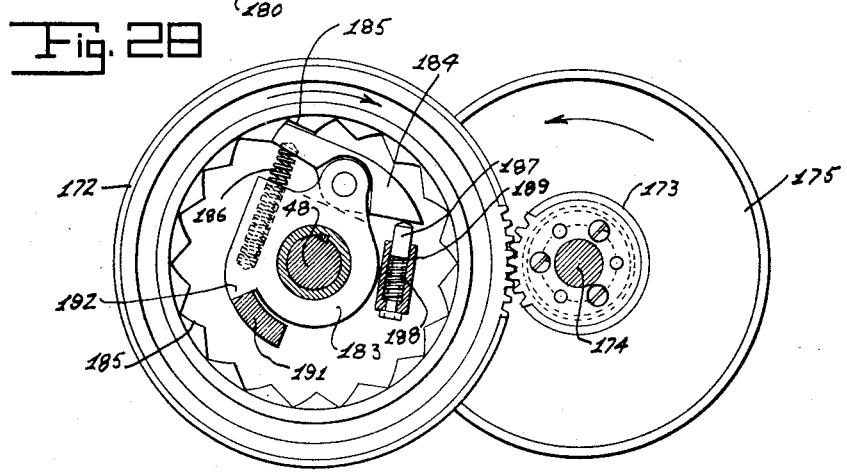

B. W. TUCKER.
MACHINE FOR FOLDING COLLARS, &c.
APPLICATION FILED MAR. 22, 1909.
1,086,421.
Patented Feb. 10, 1914.
10 SHEETS—SHEET 10.
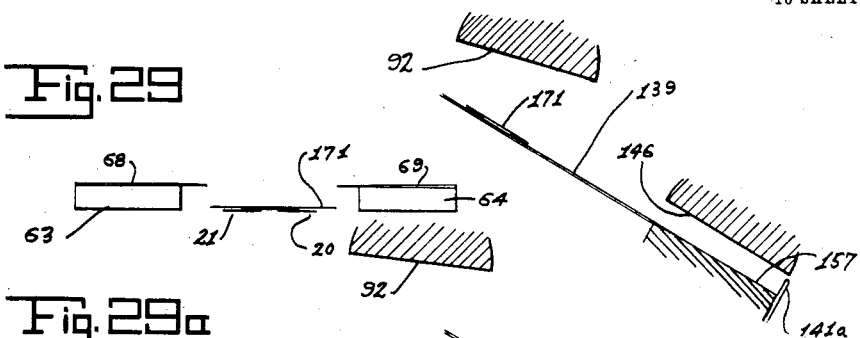
Fig. 29
Fig. 29a
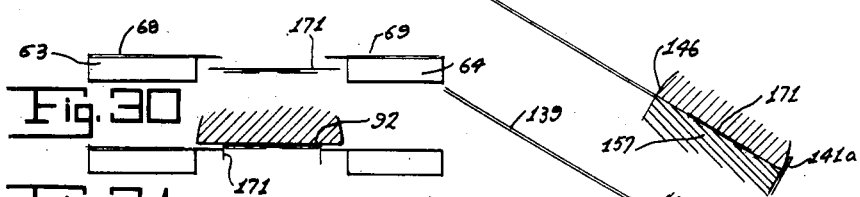
Fig. 30
Fig. 31
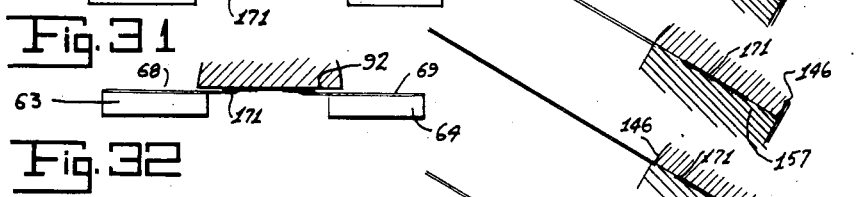
Fig. 32
Fig. 33
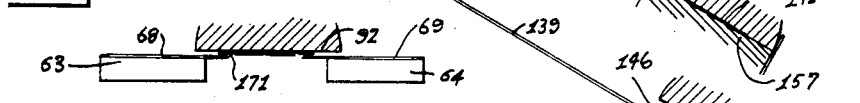
Fig. 34
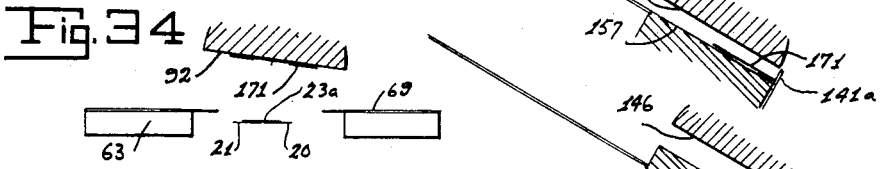
Fig. 35
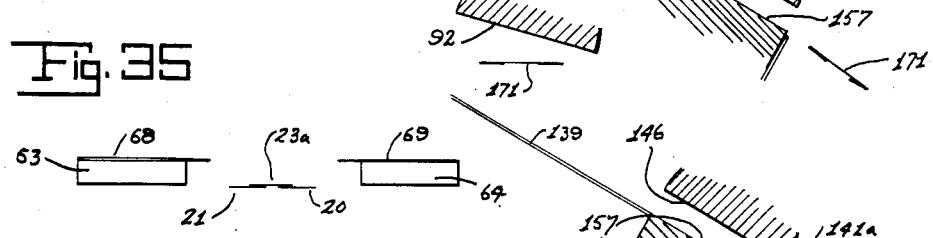
Witnesses:
Inventor
B. W. Tucker
By his Attorneys
Criswell & Criswell

UNITED STATES PATENT OFFICE.

BENJAMIN W. TUCKER, OF SOUTH ORANGE, NEW JERSEY.

MACHINE FOR FOLDING COLLARS, &c.

1,086,421.   Specification of Letters Patent.   Patented Feb. 10, 1914.

Application filed March 22, 1909. Serial No. 484,940.

*To all whom it may concern:*

Be it known that I, BENJAMIN W. TUCKER, a citizen of the United States, and a resident of South Orange, county of Essex, and State of New Jersey, have invented certain new and useful Improvements in Machines for Folding Collars, &c., of which the following is a full, clear, and exact description.

This invention relates more particularly to machinery for folding the blanks of collars and cuffs, such as disclosed in my pending application, Serial No. 435,763, filed May 29, 1908.

The primary object of the invention is to provide a simple and efficient machine in which the collar blanks may have their edges turned over, and the blank thus turned, properly pressed, and the parts for folding the blank automatically operated so that it will be unnecessary for the attendant at the machine to handle the article after it has once been placed in position for folding, thus materially saving time, and leaving the attendant's hands entirely free for other purposes, and at the same time folding the blanks more rapidly than is accomplished by machinery of this class as ordinarily constructed.

Another object of the invention is to provide simple and efficient means which will initially press the collar or other blanks after being folded, and which will deposit them in position to be further pressed by an auxiliary or final pressing mechanism provided therefor.

A further object of the invention is to provide simple and efficient means which will remove the collar or other blanks and automatically deposit the same on a device adapted to receive the folded article; and to provide means whereby all the parts may be operated from a single drive shaft.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is a front elevation. Fig. 3 is a plan view. Figs. 3ª and 3ᵇ are fragmentary views of a part of the operating mechanism of the infolders. Fig. 4 is a detail plan view of the initial heating and pressing head and the mechanism for automatically removing the article to be folded. Fig. 5 is a fragmentary front view, partly in section and partly in elevation, of the initial pressing and article removing mechanism. Fig. 6 is a side view of the parts shown in Fig. 5 in pressing position. Fig. 6ª shows the cam for operating the means shown in Figs. 5 and 6. Fig. 7 is an enlarged fragmentary detail view of the locking means for the transfer mechanism in position to deposit the articles after being folded on the receiving table or plate. Fig. 8 is a plan view of the means for infolding the blank with a part thereof removed. Fig. 9 is a front view of the infolders and part of the operating mechanism therefor. Fig. 10 is a fragmentary view, partly in section and partly in elevation, of the infolders and means for operating the same. Fig. 11 is a view similar to Fig. 10, except that the infolders are shown in their inner or folding position. Fig. 12 is a plan view of the templet or former in an expanded position, and the operating means therefor. Fig. 13 is a front elevation of the templet and part of the operating means. Fig. 14 is a side view, partly in section, showing part of the mechanism for operating the templet plates and support. Fig. 14ª shows part of the means for elevating the templet or former. Fig. 15 is a view similar to Fig. 14, except that the templet is shown in its raised or elevated position. Fig. 16 is a detail perspective view of one of the initial guides or gages for the collar blank. Fig. 17 is a plan view of the templet with the plates or members in a collapsed position. Fig. 18 is a detail view of the guiding bed or member of the templet. Fig. 19 is a front view of the templet bed. Fig. 20 is a detail perspective view of a part of the means for operating and adjusting the templet plates. Fig. 21 is a fragmentary view, partly in section, showing in full lines the cam for operating the infolders, and in dotted lines the cam for operating the mechanism which expands or contracts the templet plates. Fig. 22 is a plan view, partly broken away, of the supplementary or auxiliary pressing means or device. Fig. 23 is a front elevation, partly broken away and partly in section, of the pressing means or device and part of the operating mechanism therefor. Fig. 24 is a detail side elevation of the pressing device. Fig. 24ª is a fragmentary view showing the operating cam and section, and a part of the means for operating the pressing device. Fig. 25 is a fragmentary vertical section, through the pressing device. Fig. 26 is a sectional view of one form of clutch and driving means. Fig. 27 is a vertical section through the drive shaft showing the clutch in elevation. Fig. 28 shows in section and elevation certain features of the clutch; and Figs. 29 to 35 show various steps and positions of the infolders, templet, and presser heads or members while folding the article.

The frame 10 may be of any suitable construction, and may have a base 11 and supporting arms or brackets 12, and to the brackets 12 may be secured uprights or standards 13 on which is arranged a supporting bed or table 14. Above the table or bed 14 is a templet frame or support 15 which is vertically movable, and may be guided at its ends on the rods or shafts 16 which pass through openings in the lugs 17 of said support. This support 15 has a guiding bed, plate or member 18 which may be of the usual or of any preferred construction, and which is adapted to have suitable templet plates movable thereon which are adapted to define the shape of the article to be folded. As shown, a plate 19 of thin metal is secured to the guiding bed 18 of the support 15, and arranged so as to move relatively thereto are a plurality of plates 20, 21, 22 and 23 forming a part of the templet 23ª. These latter plates are also of thin material, and are each secured to a slide 24 which may comprise two members 25 and 26 which are adjustable relatively to each other by means of the slots 26ª and screws or bolts 26ᵇ so that the movable members of the templet or former may be lengthened or shortened according to the length of the collar or other article, the shape of the plates being varied according to the nature of the article to be folded. The members 25 each have two parts 26ᶜ and 26ᵈ rigidly held together, and the member 25 of the templet plate 20 is secured to a diagonally movable plate, block or slide 27, the member 25 of the plate 21 to a slide 28, the member 25 of the plate 22 to a slide 29, and the member 25 of the plate 23 of the templet to a slide 30. The slides are secured to the parts 26ᶜ of the member 25 of the several templet plates, and intersect each other in pairs, and are arranged so as to properly pass each other, and the parts 26ᶜ of the slides 27 and 28 are connected by the transverse or cross-bar 31 to work in unison, while the parts 26ᶜ of the slides 29 and 30 are connected to the transverse bar 32 to cause said slides to move in unison, and either inwardly or outwardly to collapse or expand the templet plates as is usual in machines of this character, the said members 25 being slidingly held to the bed 18 by the transverse plates 32ª which pass through slots 32ᵇ in said members. The transverse bars fit grooves 32ᶜ in the members 25 to permit them to move relatively to each other, and the transverse bar 32 is connected by a link 33 to one end of a lever 34. The other end of said lever is connected by a link 35 to the transverse bar 31, and said lever 34 is located under the templet bed 18, and is secured to a vertically movable shaft 36. This shaft 36 is held to rotate in and move with the bed 18 of the support 15 by a pin or otherwise, and is held in a rotatable sleeve 37, and this sleeve is journaled in a boss forming a part of the table 14 of the machine frame, and on the end of said sleeve is a bevel gear 38. The shaft 36 is provided with a key 39 by which the said shaft may be rotated and at the same time move vertically in the sleeve 37 with the templet. A gear 40 is in mesh with the gear 38 which, when partly rotated, as will be presently described, will rotate the shaft 36 and move the lever 34 to operate the links 33 and 35 so as to force the templet plates 20, 21, 22 and 23 either inward or outward to expand or collapse the same according to the direction of movement of the gears 38 and 40.

To elevate the templet plates and the frame carrying the same, and to rotate the gears 38 and 40 any suitable means may be employed. The gear 40 may be secured to a shaft 41, and to the shaft is secured an arm 42, and at the outer end of said arm is a link 43, the latter being secured to one end of a lever 44, and this lever being pivoted at 45, and having its lower end provided with a roll 46, or other means, adapted to enter the groove of a cam 47 which is secured to the shaft 48. As will be seen when the latter shaft rotates, the cam will rock the lever 44 on its pivot and through the link 43 and arm 42 will rock the shaft 41 and rotate the gears 38 and 40, and through the mechanism previously described will force the sliding blocks of the templet-operating means inward or outward, and thereby expand or collapse the templet plates. The templet plates and frame may be vertically moved by one or more links 49 secured to the under part of the templet guide-plate or bed 15, and which have their lower ends secured to the arms 50. These arms 50 are secured to a shaft 51 and at one end of the shaft is a short arm 52 which is connected by a link 53 to a lever 54, the latter being pivotally held to the shaft 45 and having its lower end at 56 provided with a roll which enters a groove in a cam 57 carried by the shaft 48, so that as the latter is rotated, the lever 54, through the shaft 51, arms 50 and links 49 will elevate or lower the templet frame and templet plates at the proper time.

The templet plates are normally in a lowered position, and the blanks of the collars or other articles are placed thereon, and adjacent to the templet plates when in a lowered position are the gages 59 and 59ª. The gages 59 may be in the form of plates for the side edges of the articles and the end gages 59ª may be angular as shown in Figs. 3 and 16, and each gage may be provided with one or more stems which are adjustably held to the brackets or standards 60 which are secured to the frame, bed or table 14, and said gages serve to properly position the blanks on the templet plates before the latter are elevated.

As the templet plates are elevated, the blanks will be carried by the templet and will be forced between and above the infolding mechanism 60ª, the latter being shown in detail in Figs. 8 to 11. This infolding mechanism may be of the usual or of any preferred construction. As shown a plurality of movable blocks or members 61, 62, 63, and 64 are slidingly held above the brackets or standards 60, and adjustably secured to the movable blocks or members are the infolding plates 66, 67, 68, and 69 respectively, which are spaced apart in pairs by the plate 69ª, the folding plate or member 69 in Fig. 8 being removed. The inner edges of the plates are made to conform substantially to the shape of the article to be folded, and are each secured to the blocks by means of bolts 70 which pass through slots 71 in said blocks. Each infolding plate or member is provided with a rib 72 which is movable in a longitudinally-arranged slot formed in the upper surface of each block to guide the infolding plates when the same are adjusted. The blocks 61 to 64 are arranged in pairs and the blocks 61 and 64 form one pair, and the blocks 62 and 63 a second pair which are opposed to blocks 61 and 64, and each pair is joined together by a slide 73 which is secured by means of bolts or screws, as 74, to one of the blocks, and is movable in a groove in the other block to permit said blocks to move toward each other and to hold the same in parallel relation while moving in unison. Each block is provided with an aperture in which is arranged a crank pin 75 which projects from a crank disk or head 76 arranged on a vertical shaft 16. Each shaft 16 is journaled in a sleeve 78 supported above the table or bed 14 of the machine frame, the upper edge of which forms a support for the eccentric head or disk 76, while each forms an additional supporting means for the blocks when the latter are moved. As the shafts 16 are rotated the heads or cranks 76 will be given a like movement, so that the pins 75, serving as crank pins, will force the blocks and infolding plates inwardly, and during this movement owing to the sliding connection between each pair of blocks, the same will move toward or from each other according to the movement of the shafts 16, and will be kept in parallel relation during such movement. The shafts 16 are given two movements, the first movement to force the infolders inward in unison to substantially fit the templet when the plates are in an expanded position and before the templet is elevated, the said infolders intercepting or engaging the overhanging part of the blank supported by the templet as the latter is elevated above the infolders, and a second movement to turn or infold the fabric, at which time one pair of infolder plates moves in advance of the other pair and completes its fold before the second pair acts when the latter completes its work of folding.

To operate the shafts 16 of the infolding mechanism 60ª, a gear 79 is arranged on the ends of each of the shafts moving the blocks 62 and 63, and on each shaft operating the blocks 61 and 64 is a gear 80. The gears 79 are in mesh with the segments 81 carried by a shaft 82, and to said shaft is secured an arm 83. A link 84 is connected to the arm 83 at one end and to a lever 85 at the other end, and this lever is operated by a cam 86, secured to the drive shaft 48. The gears 80, secured to the shafts 16 which operate the blocks 61 and 64, are in mesh with the segments 86ª, and operating these segments is an arm 87 connected by a link 88 to a lever 89. The levers 89 and 85 are pivoted or held to move on the shaft 45, and said lever 89 has one end thereof operated by a cam 90, and the lever 85 by the cam 86 both on the shaft 48 so that as said shaft is rotated the levers 89 and 85 will operate the segments referred to and rotate the gears 79 and 80 in unison or proper sequence thus forcing the infolders inwardly to fold the blanks around the templet plates and to remove the same out of the path of movement of the templet plates at the proper time. The cams 86 and 90 are so made and timed that the infolders will be moved to a distance substantially equal to the size of the templet plates when expanded after which the infolders will move inward, one in advance of the other, to fold the blank about the templet under the same and will move outward in unison after the initial pressing has taken place.

It is desirable that the blanks be heated and pressed after being folded around the templet plates, so that the folding edges will be clearly defined and the articles retain their folded position. This may be done before the templet plates are collapsed or contracted and while still holding the article by the templet over the infolders so that the pressing will take place before the templet plates are withdrawn. For this purpose a heating and pressing head or device 91 is provided. This device is best shown in Figs. 1 to 7, and is positioned above the templet and infolding mechanism, and is normally located to the rear of the machine to permit the blanks to be readily placed on the templet plates by the attendant. The pressing and heating device may be of any suitable construction, and may be heated in any desired way. The said device 91 may have a member 91ª provided with suitable electric coils within the same, which may be included in an electric circuit so as to heat the plate or table part 92 to the desired degree, the said electric circuit being indicated by the wires 93 of Figs. 1 and 3, though any other heating means may be employed. The member 91ª is supported from a cross-head or yoke 94, and this yoke is provided with sleeves 95 at its ends in which are held the arms or rods 96. The sleeves 95 are recessed, and in said recessed portions are arranged springs 97 above which are collars 98 forming a yielding connection between the rods 96 and the cross-head or yoke 94. The arms or rods 96 have their lower ends bent inwardly and are provided with slots 99 in which the ends of a bar 100 fit, the said bar being held to the machine frame and serving to guide the ends of the rods to permit the same to have a swinging upward and downward movement. An arm or lever 101 is connected to each rod 96, and said levers 101 are secured to short shafts 102 located under the table 14 at each end thereof, and on each of said shafts is a segment 103. Each segment 103 is in mesh with a larger segment 104, and the segments 104 are secured to the shaft 105, and to the shaft 105 is secured an arm 106 which is connected to a rod 107. The lower end of the rod 107 is connected to a lever 108, which is pivoted at 109 to the machine frame, and the inner end of said lever is provided with a roll or other means which enters a groove 110 in a cam 111 secured to the shaft 48. As the shaft 48 is rotated, the cam 111 will impart movement to the rod 107, and through the shaft 105 and the segments 104 and 103 will force the yoke 94 and the presser and heating device, and other means carried thereby, inwardly and downwardly so as to engage the blanks to properly press the fold before the templet plates are withdrawn. The cam 111 may be constructed to impart two motions to the presser device 91, one to engage the blank with a slight pressure, and the other with a heavy or full pressure.

The blanks, as before stated, are raised above the infolders by the templet and the pressing of the blank by the device 91 takes place while the templet plates are expanded. After the blanks are folded by the infolder mechanism, the elevating mechanism for the templet should be released to permit the templet to adjust itself to the movement of the presser device. The cam 57 has its groove cut away, as at 111ª, Fig. 14ª, to release the lifting mechanism so that the templet plates, in an expanded position, will fall back or lower on to the infolders, and the plates of the templet will adjust themselves to the action of the presser and will thereby permit a better pressing effect to be secured. By this means the pressing of the blank will take place between the presser device and the infolders before the templet plates are contracted or withdrawn.

The articles after they are pressed may be automatically removed and deposited on a receiver or other means without any handling by the operator whatever in position to be acted on by a second pressing device. To effect this the presser member 91ª is provided with two angularly arranged apertures 113 in which are movably held the needles 114 and 115. The needle 114 is adjustably held to a rod 116, and this rod is connected by an arm 117 to a shaft 118 extending transversely of the yoke or head 94. An arm 119 is connected by a rod or link 120 to an arm 121 which is held at one end to a transverse shaft 122, and on the opposite end of said shaft 122 is an arm 123, and this arm is connected by a link 124 to an arm 125 of a bell-crank lever 126 which is pivoted to the yoke 94 at 127, and has its arm 128 arranged in the path of a lug or projection 129 extending outwardly from one of the collars 98. The shaft 122 carries an arm 130, and to this arm is held a rod or bar 131 which carries the needle 115 so that when the bell-crank lever 126 is operated by the movement of one of the rods 96, the rod or link 124 will force the needles 114 and 115 by means of the mechanism already described to extend beyond the face of the plate 92 so as to pass through the article after it is folded, a spring 132 being provided to normally hold the shafts 118 and 122 in a position to force the rods 116 and 131 upward to carry the needles 113 and 115 within the device to cause the article to drop therefrom. By reason of the needles extending at an angle they will properly enter the fabric forming the folded article, and will hold the same as the device 91 is restored to its normal or starting position. The needles are forced downward by the movement of the rods 96 as the article is being pressed, owing to the yielding connection between the rods 96 and the sleeves 95 of the yoke, which permits the bars to have a movement independent of said yoke, and as soon as the needles are forced outward to engage the article a pawl 133 is made to engage the arm 128 of the bell-crank lever 126 to hold the needles in their outward position. This pawl 133 is pivoted at 134 to one of the sleeves 95 of the yoke 94, and is normally forced in one direction by a spring 135 as best shown in Figs. 6 and 7. When the pressing device reaches the position shown in Figs. 1 to 3, the lower end 136 of the pawl will engage a stationary adjustable stop, as 137, arranged on a bracket 138 and will release the lever 128, and as soon as the said lever is released the spring 132 will quickly force the needles within the member 91ª of the presser device. This will cause the folded article to drop therefrom, so that the latter will be deposited on the plate or member 139. The needles 114 and 115 may be held to the rods 116 and 131 by a collar forming a chuck 140 and said rods may be threaded and provided with a thumb-nut 140ª for adjusting purposes.

As the articles are dropped from the initial pressing device, they will be deposited on a plate 139, serving as a conveyer, which will cause the folded articles to be positioned under a second and final pressing device or element 141. The plate or receiving device 139, Figs. 1 to 3, and Figs. 22 to 25 is arranged at an incline so that the folded blank is adapted to pass by gravity to engage a stop or bracket 141ª extending upward from the machine table or bed, and movable adjacent to the stop 141ª are the movable elements or members of the second or supplementary pressing device 141. As shown there are two members 142 and 143 both of which are movable, and said members are relatively movable with respect to each other. The member 142 comprises a head 144 to the under surface of which may be held a plate 145 and around the plate may be held a padding of soft or flexible material, as 146, and said head 144 is held to a transverse brace or beam 147. The beam 147 is held to the head 144 by the bolts 148, and said beam or element is provided with bosses 149 at its ends through which pass the rods 150, and on said rods are the nuts 150ª for properly adjusting the beam or element 147 and the head 144 carried thereby. These rods 150 each have a reduced portion 151 and an enlarged portion 152 so as to provide shoulders 153 against which are adapted to rest the ends 154 of the presser member 143, the said ends being provided with openings for the reduced parts 151 of the rods 150, and arranged around the rods 150 and interposed between the bosses 149 and the ends 154 are the springs 155 to yieldingly and normally hold the presser members 142 and 143 apart.

The member 143 of the second and supplementary pressing device may comprise a transversely-extending part 156 to which is held a heating plate 157, and said plate is adapted to be heated through the electric wires 158, or otherwise, so that the blanks as they are being pressed will be heated properly to cause the folds to retain their folded position, the packing or padding 146 serving to compensate for any unevenness or irregularity in the blank during the pressing operation. The heating member 143 is movable with the rods 150 during the upward movement thereof, owing to the shoulders 153, so that the blanks after being finally pressed may be raised above the upper edge of the stop 141ª to permit the pressed blanks to pass to a receiver 159, or other means, and said rods 150 at their lower ends are provided with collars 160 between which are held the ends of arms 161 which are held to move with the shaft 162. The rock shaft 162 is provided with an arm 163, and this arm connects by a link or rod 164 to a bell-crank lever 165, Fig. 24ª, and one end of said bell-crank lever 165 is provided with a trundle 166 which engages a cam groove 167 of a cam 168, said cam being timed with relation to the movement of the initial pressing device 91 so as to operate the rods 150 when the blank has been folded and initially pressed and deposited on the plate 139 so as to pass to the space between the members 142 and 143. During the downward stroke of the rods 150 the two members 142 and 143 will move together until the ends of the members 143 engage the brackets 169 projecting inward from the bosses 170 of the machine frame, said bosses serving as guiding means in which the rods 150 are adapted to move. When the heating member 143 engages the bracket 169, the rods 150 will cause the member 142, and its head 144, to have a still further movement, which will be permitted by springs 155, and during this further movement of the member 142 the folded article will have its pressing completed between the two members 143 and 142, and at the upward movement of the rods 150, the presser member 142 will rise first and then the member 143, owing to the shoulders 153 of said rods engaging the same, so that the pressed blank will be raised above the bracket or stop 141ª. By this means the blanks may be initially pressed before the die or templet is contracted or collapsed, and the folded blanks deposited in position to receive a second and complete pressing, the pressure of which may be varied according to the nature of the article to be folded, and may take place over the entire blank or at the folded edges of the blanks.

The construction and operation of the parts thus far described, will be readily understood from the foregoing description when taken in connection with the accompanying drawings, and the several steps of the folding of the blanks will be more readily understood from the illustrations in Figs. 29 to 35. The parts as shown in Figs. 1, 2 and 3 are in their normal position, and the blank as 171, Fig. 29, is placed upon the templet or former so as to rest between the gages 59 and 59ª located adjacent thereto, the infolders being far enough apart to permit this. The templet plates in an expanded position are then moved vertically above the infolding plates, the infolding plates having been previously moved inward just far enough to permit the plates to pass by the same as shown in Figs. 29ª and 30, which will cause the infolders to engage the edges of the blank and force the same downward. As this operation is being effected, the presser and heating device 91 is being forced inwardly and downwardly so as to rest upon the blank lightly or otherwise while the infolding is taking place. The infolders are then forced farther inward, as shown in Figs. 31 and 32, and the templet elevating mechanism is released leaving the folded edges of the blank between the same and the infolder plates, and the initial presser device as shown in Figs. 31 and 32. The blank is pressed between the presser device and the infolders while the templet plates are still expanded, at the same time applying heat to the folded article so that the same will retain its shape, and owing to the yielding connection between the yoke or cross-head 94 and the rods 96, the said presser plate may be made to give the desired pressure to the article, and the rods 96 permitted to move downward independent of the movement of said yoke. After the article has been pressed, the templet plates will be collapsed and the presser device as well as the templet will be restored to their former position by the mechanism already described, and as shown more clearly in Figs. 1 to 3, and diagrammatically in Figs. 29 to 35. The infolders move outward in unison but move inward one in advance of the other, and after the initial pressing has taken place, the device 91 will carry the folded blank and will deposit the same on the plate 139. As one blank is being folded and initially pressed, another blank is being finally pressed by the device 141. This device as well as the plate 139 are inclined so that the blank as soon as it is deposited on said plate 139, will pass between the members 142 and 143 and will be finally pressed and afterward caused to pass from the device and properly stacked for removal if so desired.

The machine is preferably not operated continuously, and the drive shaft 48 which operated the several mechanisms is under the direct control of the attendant, and may be started and stopped at will, and the usual or any preferred means may be provided for this purpose. As shown the shaft 48 is provided with a gear 172, and meshing with the gear 172 is a pinion or gear 173 which is held to a shaft 174. On the shaft 174 is a drive pulley 175 by which the shaft 48 may be rotated, and on said shaft, and movable independent thereof is a clutch wheel 176. This wheel or disk 176 is provided with two stops or teeth 177 and 178 which are adapted to be engaged by a pawl 179 which is pivoted at 180 to the machine frame, on the outer end of which is arranged a treadle 181, the said pawl being normally forced in one direction in the path of engagement of the teeth of the disk 176 by means of a spring 182. A collar 183 is secured to the shaft 48, and this collar carries a pawl 184 which is adapted to engage the teeth 185 forming a part of the gear 172, and carried by the collar 183 is a spring 186 which is arranged to force the pawl at the proper time into engagement with the teeth 185. The pawl 184 is pivoted to the collar 183 and has one end adapted to be engaged by a spring-pressed bolt 187. This bolt 187 is normally forced outward by the spring 188 which is of greater tension than the spring 186, and said bolt is arranged in a boss 189 carried by a disk 190 which is loosely arranged on the shaft 48, and to which is held the wheel 176. The spring 186 normally forces the pawl 184 into engagement with one of the teeth 185 of the gear 172, the stop 191 carried by the disk 190 at this time engaging the projection or tooth 192 of the collar 183, and the bolt 187 resting against a part of the pawl 184. When the pawl 179 engages either teeth 177 or 178 it will stop the disk 190 from rotating and will also stop the parts carried thereby. The bolt 187 will now compress the spring 186 and will force the pawl 184 out of engagement with the teeth 185, allowing the gear 172 to rotate independent of the shaft 48.

While the mechanism for initially folding and pressing the blanks of collars and the like is substantially the same in construction as that shown in my pending application, Serial No. 435,763, filed May 29, 1908, hereinbefore referred to, and differs mainly from the construction of the said application in that the blanks are twice pressed, once before the die or templet is withdrawn from the folded blanks and a second time after the folded blanks have been transferred from the folding mechanism, it is to be understood that I do not claim specifically such mechanism herein as the same is claimed in the said application, and so far as the mechanism referred to is concerned and applied herein, the same may be of any suitable construction, as the present invention lies principally in the means for giving two distinct and independent pressing and ironing effects to the blanks.

The specific form of infolding mechanism shown is not claimed herein, but will form a part of an application to be filed.

From the foregoing it will be seen that simple and efficient means are provided whereby the blanks for collars and other articles may be automatically folded, heated and pressed; that parts of the apparatus may be used in other forms of folding machines for folding articles of the same general character; that the articles when folded may be initially pressed and may be automatically removed and positioned convenient to a second supplementary or auxiliary pressing means so that great pressure may be given to produce a proper ironing effect to the folded article, and to provide a machine which will not necessitate handling the articles except for placing the blank upon the folding mechanism and for removing the articles after a number of them have been folded, leaving the attendant's hands entirely free and materially adding to the speed with which articles of this class may be folded, and at the same time permit a much cheaper class of labor to be employed.

Having thus described my invention, I claim as new and desire to secure by Letters Patent:—

1. In an infolding mechanism, the combination with a templet, of means for folding the edges of a blank, inwardly and downwardly moving means for pressing the blank before the templet is contracted, means for removing the blank from the templet after the latter has been contracted, and downwardly moving means for pressing the folded blank after the same has been removed.

2. In an infolding machine, the combination with a templet, of means for folding the edges of a blank about the templet, an inwardly and downwardly moving reciprocatory device for initially pressing the blank before the templet is contracted, means carried by said device for removing the blank from the templet after the latter has been contracted, and a second downwardly and inwardly moving reciprocatory device for pressing the folded blank.

3. In an infolding machine, the combination with a vertically movable templet having contracting and expanding plates forming a support for the blanks, of infolders movable inward toward the templet plates, initial guides arranged convenient to the plates, means whereby the templet may be held elevated and then released to move freely vertically while the plates are expanded, initial pressing means, means for contracting the templet plates after the initial pressing, means for removing the blanks from the templet plates, a receiver plate, and a second movable pressing device having independent relatively movable members adapted to receive the blank between them and to complete the pressing of the blank.

4. In an infolding machine, the combination with a movable templet having contracting and expanding plates, of infolders movable inward toward the templet plates to fold the blank, means whereby the templet may be held elevated and expanded while the blank is being folded and then released to permit the templet to lower and before the contracting mechanism is released, a pressing device, means for contracting the templet plates after the blank has been pressed, a receiver plate, means for removing the blanks from the templet plates and depositing the same on said receiver plate, and a second movable pressing and heating device adapted to complete the pressing of the blank.

5. In an infolding machine, the combination with a templet having contracting and expanding plates, of infolders movable inward toward the templet plates, of an initial pressing device, a receiving device, means for removing the blanks from the templet, and depositing the same on said receiving device, and a second movable pressing device having members movable together and independent of each other and adapted to receive the blanks between them and to complete the pressing of the blank.

6. In an infolding machine, the combination with a vertically movable templet having contracting and expanding plates, of infolders movable inward toward the templet plates, means whereby the templet may be held in its vertical elevated position while folding and then released in its elevated position while pressing and while the plates are expanded, a pressing device, means for contracting the templet plates after the initial pressing, means for removing the blanks from the templet, and a second movable pressing device having independent relatively movable members adapted to receive the blanks between them and to complete the pressing of the blank.

7. In an infolding machine, the combination with a templet having contracting and expanding plates forming a support for the blanks, means for contracting and expanding the plates of infolders movable inward toward the templet plates, of initial guides arranged convenient to the plates, means whereby the templet may be held against movement and then released without releasing the contracting mechanism, an initial pressing device, means for contracting the templet plates after the initial pressing, means for removing the blanks from the templet plates, and a second movable pressing device having independent members adapted to receive the blanks between them and to complete the pressing of the blank.

8. In an infolding machine, the combination with a templet having contracting and expanding plates forming a support for the blanks, of infolders movable inward toward the templet plates, of an initial heating and pressing means, means for contracting the templet plates after the initial pressing, a receiver plate inclined relative to the templet plates, means for transferring the blanks from the templet plates to said plate, and a second movable pressing means adapted to receive the blanks from said plate and press the same.

9. In an infolding machine, the combination with a templet having contracting and expanding plates forming a support for the blanks, of means for elevating the templet plates and the blank supported thereon, means adapted to move inward and fold the blank, two movable heating and pressing devices, and means for transferring the blank from one device to the other.

10. In an infolding machine, the combination with a templet having contracting and expanding plates, of means adapted to move inward and fold the blank, two independent and reciprocatory heating and pressing devices angularly arranged with respect to each other, and means carried by one device for transferring the blanks to the other.

11. In an infolding machine, the combination with a templet, of means adapted to move inward and fold the blank, two independent pressing devices angularly arranged with respect to each other, and means carried by one device for transferring the blanks to the other.

12. The combination with a templet, of infolders movable toward and from the templet, means for holding and then releasing the templet, reciprocatory means for heating and pressing the blank while the templet is released, and before the contracting mechanism is operated, means for contracting the templet, a second and independently movable heating and pressing device having two relatively movable members, and means for transferring the blank from one pressing device to the other.

13. The combination with a vertically movable templet having contracting and expanding plates, of infolders movable toward and from the templet and under the same, means for holding the templet elevated and for releasing the same, reciprocatory means for pressing and heating the blank while the templet is released in its elevated position and the plates expanded, means for contracting the templet plates, a second and independently movable heating and pressing device having two relatively movable members, and means for transferring the blank from one pressing device to the other.

14. The combination with means for folding and initially pressing a blank including an inwardly and downwardly movable initial pressing device, of a second reciprocatory pressing device angularly arranged with respect to the initial pressing device, and means carried by the initial pressing means for transferring the blank from the folding means to the second pressing device.

15. The combination with a templet having contracting and expanding plates, of means for folding and pressing the blank before the templet is contracted, means for contracting the templet, transferring means for the folded blank, a second pressing device having a movable heating member and a movable pressing member provided with a yielding surface, means for moving the two members together and independent of each other and means for positioning the blank between said members.

16. The combination with a templet having contracting and expanding plates, of folding means folding the blank under the templet plate, a device for pressing the blank before the templet is contracted, means for contracting the templet, transferring means for the folded blank, and a second device having a heating member, and a pressing member provided with a yielding surface.

17. The combination with means for folding and initially pressing a blank, of transfer means, a pressing and heating device comprising two members, one for heating and the other for pressing, means for yieldingly connecting the two members to move in unison and to have a relatively independent movement, means for reciprocating the members, and a stop for positioning the blank between said members.

18. The combination with means for folding and initially pressing a blank, of transfer means, a pressing and heating device comprising two members, one for heating and the other for pressing, means for yieldingly connecting the two members to move in unison and to have a relatively independent movement, and a stop for positioning the blank between said members.

19. The combination with means for folding and initially pressing a blank, of transfer means, a pressing and heating device comprising two members, one for heating and the other for pressing, and means for yieldingly connecting the two members to move in unison and to have a relatively independent movement.

20. The combination with means for folding and initially pressing a blank, of a support, a stop, a second heating and pressing device having two members, one of which is for heating and the other for pressing, a yielding padding carried by the pressing member, rods connected to the pressing member, springs surrounding the rods and interposed between the members, a rock shaft, arms engaging the rock shaft, means for operating the arm, means whereby the heating member may have a limited movement in one direction and may be moved in the opposite direction a sufficient distance to raise the blanks after being pressed above the stop.

21. The combination with means for folding and initially pressing a blank, of a support, a stop, a second heating and pressing device having two members, one of which is for heating and the other for pressing, a yielding padding carried by the pressing member, and means whereby the heating member may have a limited movement in one direction and may be moved in the opposite direction a sufficient distance to raise the blanks after being pressed above the stop.

22. The combination with means for folding and initially pressing a blank, of a support, a stop, a second heating and pressing device having heating and pressing members, rods connected to the pressing member, springs surrounding the rods and interposed between the members, a rock shaft, arms engaging the rock shaft, means for operating the arms, and means whereby the heating member may have a limited movement in one direction and may be moved in the opposite direction a sufficient distance to raise the blanks after being pressed above the stop.

23. In an infolding machine, the combination with a templet having contracting and expanding plates, of infolders movable inward in sequence and outwardly in unison and folding the blank under the templet plates, means for initially pressing the blank before the templet is contracted, and a second heating and pressing device for heating and pressing the blank after the same has been folded and initially pressed.

24. The combination with means for folding and initially pressing a blank, of means for transferring the blank, a plate inclined relatively to the folding means, a stop for positioning the blank as it moves along the inclined plate, and a pressing device comprising two relatively movable members between which the blank may be pressed, one of said members being adapted to raise the pressed blank above said stop to permit the blank to pass from between the members.

25. The combination with means for folding and initially pressing a blank, of means for transferring the blank, a plate inclined relatively to the movement of the folding means, a stop for positioning the blank as it moves along the inclined plate, and a pressing device inclined with respect to a vertical plane and comprising two bodily and relatively movable members between which the blank may be pressed, one of said members of the pressing device being adapted to move the blank above the stop after pressing.

26. In an infolding machine, the combination with a templet having expanding and contracting plates, of infolders movable toward and under the same for folding the edges of the blank under the templet plates, two distinct and independent means for pressing and heating the blank, together with mechanism for automatically actuating the templet plates, infolders and pressing and heating means whereby the blanks of collars and analogous articles may be folded and pressed automatically.

27. In an infolding machine, the combination with a templet having expanding and contracting plates, of infolders movable toward and under the same for folding the edges of the blank under the templet plates, two distinct and independent devices for pressing the blank at different times, one of which presses the blank over the templet plates and infolders, together with mechanism for automatically actuating the templet plates, infolders and pressing means.

28. In an infolding machine, the combination with a templet, of means movable toward and under the templet for folding the edges of the blank about the templet on the under face thereof, and independent means for pressing the blank at different periods, one of said means pressing the blank over the templet plates and infolders.

29. In an infolding machine, the combination with a templet having contracting and expanding plates forming a support for the blanks, of initial guides arranged convenient to the templet plates, means for elevating the templet plates to raise the blanks above the guides, infolders adapted to move under the templet plates and to fold the blank inward under the same, a pressing device having a swinging and downward movement adapted to engage and press the blank between the head and the infolders before the templet plates have been contracted and removed, means for contracting and expanding the templet plates, with means for automatically operating the infolders and the presser device, and a second pressing device acting independently of the other pressing device.

30. In an infolding machine, the combination with a templet having contracting and expanding plates forming a support for the blanks, of initial guides arranged convenient to the templet plates, means for elevating the templet plates to raise the blanks above the guides, infolders adapted to move under the templet plates and to fold the blank inward under the same, a pressing device located above the infolders and having a swinging and downward movement adapted to engage the blank and press the same primarily while held by the templet plates and the infolders and adapted to further press the blank between said device and the infolders before the templet plates have been contracted or removed, and means for contracting and expanding the templet plates.

31. In an infolding machine, the combination with a templet forming a bed for the blanks, of means for elevating the templet plates to raise the blanks, infolders adapted to move under the templet and to fold the blank inward under the same, a pressing device located above the infolders and having a swinging and downward movement adapted to press the blank between the device and the infolders before the templet plates have been removed, together with means for automatically operating the infolders and the pressing device.

32. In an infolding machine, the combination with a templet having contracting and expanding plates forming a support for the blanks, of means for elevating the templet plates to raise the blanks, means adapted to move under the templet plates and to fold the blank inward under the same, a heating device having a swinging and downward movement adapted to engage the blank and heat the same, while the templet plates are within the blank and expanded, and means for contracting and expanding the templet plates.

33. In an infolding machine, the combination with a templet having contracting and expanding plates forming a support for the blanks, of infolders adapted to move under the templet plates and to fold the blank inward under the same, and a pressing and heating device having an inward and downward movement adapted to engage and press the blank between the device and the infolders before the templet plates are withdrawn, and a second and independent pressing device for pressing the blank after the templet plates are withdrawn.

34. In an infolding machine, the combination with a templet having contracting and expanding plates, infolders adapted to fold the blank downward and inward with the templet plates as a guide, and a pressing and heating device having an inward and downward movement adapted to press the blank between the device and the infolders before the templet plates have been removed and a second independent pressing device for the blanks.

35. In an infolding machine, the combination with a vertically movable support, of a templet having contracting and expanding plates carried by the said support, infolders movable inward toward the templet plates under the same, means for automatically raising the templet plates above the infolders, together with an inwardly and downwardly moving pressing and heating device adapted to engage and press the blank while the templet plates are in an expanded position, and independent means to press the folded blank after said templet plates are contracted and removed.

36. In an infolding machine, the combination with a vertically movable templet having contracting and expanding plates, of infolders movable inward toward the plates under the same, means for automatically raising the templet plates above the infolders, an automatically actuated inwardly and downwardly moving pressing and heating device adapted to press the blank after being folded, a second and independent pressing device, and means for transferring the blank to the second device.

37. In an infolding machine, the combination with a vertically movable templet having contracting and expanding plates, of infolders movable inward toward the plates, means for automatically raising the templet plates above the infolders, an inwardly and downwardly moving presser device adapted to press the folded blank while the templet plates are expanded, automatically actuated means for operating the templet plates and infolders in sequence, and a second pressing device for operating on the blanks after the templet plates have been contracted.

38. In an infolding machine, the combination with a templet, of infolders movable inward under the fold defining edges of the face of the templet, independent initial and final pressing means for the blanks, cranks connected to the infolders, shafts to which the cranks are connected, a drive shaft, and means connecting the drive shaft with the eccentric shafts whereby the latter may be automatically oscillated to move the infolders.

39. In an infolding machine, the combination with a templet having contracting and expanding plates, of infolders adapted to engage the blank and fold the same inward under one face of the templet plates, means operatively connected to move the templet plates, a rotary shaft connected to said means, a cam, a drive shaft to which the cam is secured, a lever operated by the cam, means operated by the lever to impart movement to the first-mentioned shaft whereby the templet plates may be automatically expanded and contracted when the drive shaft is operated, and indepenent pressing means for the blank.

40. In an infoling machine, the combination with a templet having contracting and expanding plates, of infolders adapted to engage the blank and fold the same inward on one face of the templet plates, arms operatively connected to move the templet plates, a shaft for operating the arms, gears for operating the shafts, a cam, a drive shaft to which the cam is secured, a lever operated by the cam, and means operated by the cam for imparting movement to the gears, and two independent devices for pressing the blank at differnt times.

41. The combination with means for folding collar blanks and analogous articles, of a pressing device having a plate adapted to engage the blank, a receiver plate inclined relative to the templet plates, means movable with the pressing device adapted to engage the blanks after they are folded and as they are pressed for automatically removing the same from the folding means and to automatically deposit the same on the receiver, and a movable second pressing device comprising a plurality of members between which the article is pressed, said device being angularly arranged with respect to a vertical plane for pressing the blank after the same is deposited on the receiver.

42. The combination with means for folding blanks of collars and analogous articles, of a movable pressing device, means for moving the device, movable needles carried by the device and angularly arranged with respect to the pressing face of said device, means for operating the needles to engage the articles and remove them after being folded, and a second bodily movable pressing device for receiving the blank from the first-mentioned device.

43. The combination with means for folding blanks of collars and analogous articles, of a movable pressing device, means for moving the device, movable needles carried by the device and angularly arranged therein with respect to the pressing face thereof, means for moving the needles to engage the articles and remove them after being folded, and a second pressing device for receiving the blanks from the first-mentioned device.

44. In an infolding machine, the combination with means for folding collar blanks and analoguos articles, of a pressing device having a plate adapted to engage the blank, a receiver, means movable with the pressing device and adapted to engage the blanks and automatically remove the same from the folding means and to automatically deposit the same on the receiver, and a second bodily movable pressing device receiving the blanks from the first-mentioned device.

45. In an infolding machine, the combination with a templet having contracting and expanding plates, of infolders adapted to move inwardly to fold the blanks about the templet plates, a pressing and heating device adapted to engage the blank and press the same after it has been folded, means carried by the pressing device adapted to engage the folded blanks for removing the same after being folded, a receiver, means whereby the folded blanks may be deposited on the receiver, a second independent pressing device receiving the blanks from the receiver, a drive shaft, together with mechanism for operating automatically and in regular sequence the templet plates, infolders, pressing devices and blank-removing means.

46. In an infolding machine, the combination with a templet having contracting and expanding plates, of infolders adapted to move inwardly to fold the blanks about the templet plates, a downwardly and inwardly moving pressing device adapted to engage the blank and press the same, means carried by the pressing device adapted to engage the folded blanks for removing the same after being folded, a second independent pressing device, together with mechanism for operating automatically and in regular sequence the templet plates, infolders, and pressing devices.

This specification signed and witnessed this nineteenth day of March, A. D. 1909.

BENJAMIN W. TUCKER.

Witnesses:
    FREDERICK B. BLACKMAN,
    CECELIA A. HURLEY.

---

Copies of this patent may be obtained for five cents each, by addressing the " Commissioner of Patents, Washington, D. C."